Figure 1:
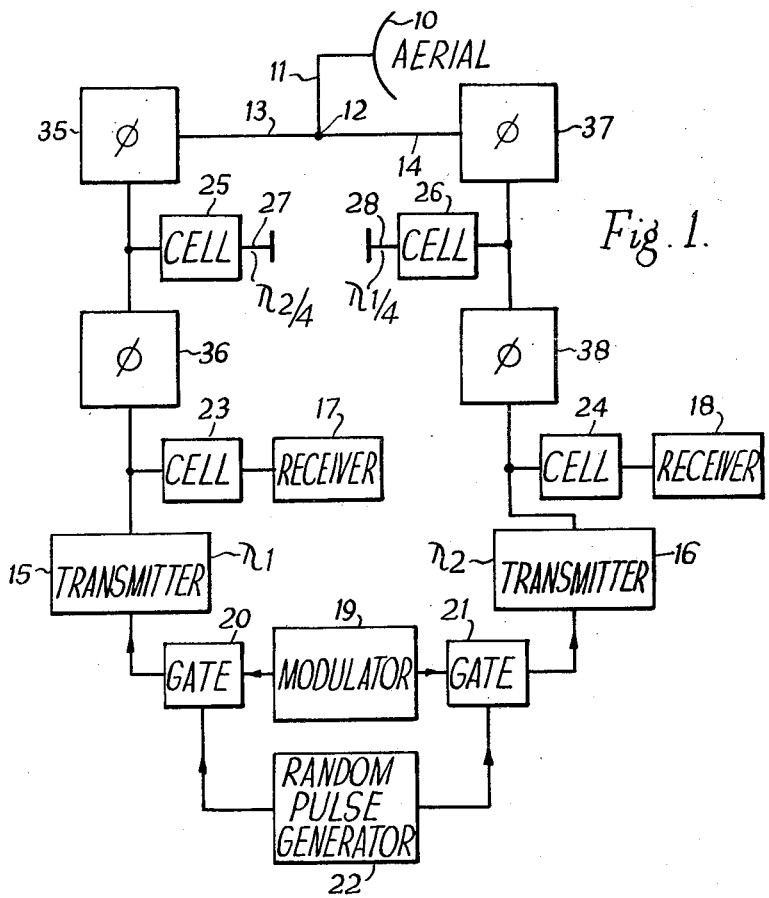

Dec. 22, 1964    P. BRADSELL    3,162,853
DIVERSITY RADAR INSTALLATIONS
Filed Feb. 10, 1961

INVENTOR
Peter Bradsell
BY
Kemon, Palmer, Stewart & Estabrook
ATTORNEYS 3,162,853
DIVERSITY RADAR INSTALLATIONS
Peter Bradsell, London, England, assignor to A. C. Cossor Limited, London, England, a British company
Filed Feb. 10, 1961, Ser. No. 88,499
Claims priority, application Great Britain, Feb. 10, 1960, 4,730/60
2 Claims. (Cl. 343—17.1)

The present invention relates to diversity radar, that is radar installations comprising two radar transmitters each with its associated receiver, the two transmitters and their associated receivers being tuned for operation on different frequencies. In use the two transmitters are arranged to transmit pulses of radio-frequency energy at different instants. It need not, of course, be arranged that the pulses from the two transmitters occur regularly and alternately. In fact it is preferred to generate the pulses in random fashion both as to time spacing and interlacing.

It has been proposed to connect the two transmitters and their associated receivers to a common aerial. This, however, gives rise to two problems, namely, the loss of power in each transmitter circuit where the other transmitter delivers power for transmission and the loss of energy in received echo signals by division of the received energy between the two halves of the installation.

In order to deal with the first of these problems it has been proposed to include in the branch to each half of the installation a phase-shifting device or its equivalent whereby each transmitter can be arranged to reflect power from the other transmitter into the aerial arm of the junction between the feeders to the two transmitters and the aerial feeder, the phase of the reflected waves being an optimum for delivery of power to the aerial.

There still remains, however, the problem of preventing undue loss of received energy and it is the object of the present invention to provide a diversity radar installation whereby this can be avoided.

According to the present invention a diversity radar installation comprises an aerial connected through a transmission line to a junction from which the transmission line is connected through two branches to two radar transmitters respectively each having an associated receiver, each branch including a transmitter blocking cell backed by a section of transmission line short-circuited at its end remote from its associated blocking cell and having an electrical length of an odd multiple of a quarter of the wavelength to which the transmitter and receiver in the other branch are tuned, whereby signals received at the said wavelength are reflected towards the junction, the characteristics of the said section of transmission line being such that the section provides a matching impedance at the wavelength to which the transmitter and receiver in its own branch are tuned, whereby signals received at the last said wavelength are not reflected and the two branches further including phase-shifting means between the junction and each blocking cell, the phase-shifting means being adapted for the maximum delivery of reflected energy from each blocking cell into the other branch.

Figure 2:
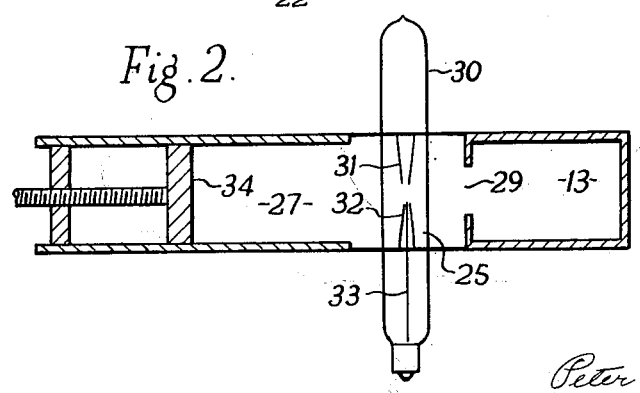

The invention will now be described, by way of example, with reference to the accompanying drawings, in which:

FIG. 1 is a block schematic diagram of a frequency-diversity radar installation, and FIG. 2 shows a transmitter blocking cell and a short-circuited section of transmission line in the form of a waveguide.

In FIG. 1 an aerial 10 is connected through a transmission line 11 to a junction 12 from which it is connected through two branches 13 and 14 to two transmitters 15 and 16 respectively which have associated receivers 17 and 18.

The transmitters 15 and 16 are of conventional form and are controlled by a common modulator 19 which is connected through two gates 20 and 21 to the two transmitters 15 and 16 respectively. The gates 20 and 21 are in turn controlled by a random pulse generator 22 which permits the modulator 19 to operate the two transmitters at different instants. The recurrence frequency of each transmitter is thus varied in random fashion and although there may be periods when the transmitters operate alternately in general there is no fixed pattern of operation.

The receiver 17 is connected into the branch 13 in conventional manner through a transmit-receive box or cell 23 and the receiver 18 is likewise connected into the branch 14 in conventional manner through a transmit-receive box or cell 24.

In addition the two branches 13 and 14 include two transmitter blocking cells 25 and 26 respectively which are backed by short-circuited sections of transmission line 27 and 28.

Each of the cells 25 and 26 with its associated section of transmission line may be as shown in FIG. 2.

In FIG. 2 which shows the cell 25 and section 27 of transmission line of FIG. 1, the branch 13, shown as a waveguide, has an iris 29 in one of its shorter walls and a conventional gas-filled tube 30 with spaced electrodes 31 and 32 is mounted adjacent the iris 29. A conventional keep-alive electrode 33 is also provided and the electrodes 31 and 32 are connected to the two longer walls of the waveguide 13 whereby the gap between the electrodes 31 and 32 is across the waveguide 13.

The section 27 of transmission line is also in the form of a waveguide and is provided with a tuning plunger 34 whereby the effective length of the section can be varied.

If the different wavelengths of the oscillations generated by the two transmitters are represented by $\lambda_1$ and $\lambda_2$ the plungers in the two sections 27 and 28 of transmission lines are adjusted to make the electrical lengths of these two sections equal to $\lambda_{2/4}$ and $\lambda_{1/4}$ respectively.

By suitable design of the two sections 27 and 28 of transmission line the impedances they present to their associated branches is made to match the branch impedances at the wavelengths $\lambda_1$ and $\lambda_2$ respectively when the gaps are not ionized.

In operation, whenever either transmitter operates all four of the cells 23, 24, 25, 26 are ionized. The cells 23 and 24 serve to protect their associated receivers in the conventional way.

The cells 25 and 26, when ionized, merely provide zero series impedance in their associated branches whereby the pulse generated by the transmitter passes to the junction 12.

At the junction there are two paths namely the path to the aerial and the path to the other transmitter.

Because of the difference in frequency between the two transmitters the magnetron in the output of each provides a reflecting impedance at the wavelength of the other. In order to ensure that the power reflected from each transmitter reaches the junction 12 in the correct phase for combining with the energy from the other transmitter the two branches are provided with two phase-shifters, phase-shifters 35 and 36 being provided in the branch 13 and phase-shifters 37 and 38 being provided in the branch 14.

The phase-shifters are adjusted for optimum performance.

When echo signals are being received they reach the junction 12 where they pass into both branches. Signals of wavelength $\lambda_1$ are, however, reflected at the blocking cell 26 and similarly signals of wavelength $\lambda_2$ are reflected at the blocking cell 25.

The phase-shifters 35 and 37 are so adjusted as to ensure that signals reflected from the blocking cells arrive at the junction 12 in the correct phase for combining with the signals arriving at the junction 12 from the transmission line 11. Such adjustment of the phase-shifters 35 and 37 must, of course, be accompanied by adjustment of the phase-shifters 36 and 38 to maintain optimum conditions for transmission.

It will be understood that where the transmitters are designed for operation on predetermined fixed frequencies the phase-shifters 35, 36, 37 and 38 can take the form of appropriate lengths of transmission line.

In practice the two frequencies employed will normally be spaced by at least 10% of the lower frequency, they can be more closely spaced by making the short-circuited sections 27 and 28 of transmission line several odd quarter wavelengths long.

I claim:

1. A diversity radar installation comprising in combination:
   an aerial;
   two radar transmitters;
   two radar receivers operatively associated respectively with said transmitters;
   two transmit-receive cells operatively associated respectively with said receivers;
   a junction;
   a transmission line connected between said antenna and said junction;
   a pair of branch transmission lines between said junction and said transmitters and associated receivers respectively;
   means connected into each of said branch transmission lines including a blocking cell, a section of transmission line connected to said cell, short circuited at the end remote from said cell and being an odd number of quarter wave lengths of the wave length to which said transmitter and receiver in the other branch are tuned, each of said transmit-receive cells and said blocking cells being connected to be ionized whenever either transmitter is fired;
   first phase-shifting means connected between said junction and each blocking cell to ensure that on reception of energy in one branch at the wave length of the receiver of the other branch such energy is reflected from the short-circuited section of transmission line in said one branch to said junction with a phase-shift of a whole number of cycles;
   and second phase-shifting means connected in each said branch transmission line between said blocking cell and said transmitter, said first and second phase-shifting means serving in combination to provide that on the transmission of energy by the transmitter in one branch, power is reflected from the transmitter in the other branch to said junction with a phase-shift of a whole number of cycles.

2. The combination as defined by claim 1 and further including:
   a common modulator;
   means including gate circuits connecting said modulator to each transmitter;
   and a random pulse generator connected to said gate circuits to open said gate circuits at different random instants of time.

References Cited in the file of this patent

UNITED STATES PATENTS

| | | |
|---|---|---|
| 2,198,113 | Holmes | Apr. 23, 1940 |
| 2,484,798 | Bradley | Oct. 11, 1949 |
| 2,671,896 | De Rosa | Mar. 9, 1954 |
| 2,712,646 | Lawson et al. | July 5, 1955 |
| 2,810,830 | Glass et al. | Oct. 22, 1957 |